(12) United States Patent
Giraud et al.

(10) Patent No.: US 6,713,990 B1
(45) Date of Patent: Mar. 30, 2004

(54) DEVICE FOR PRODUCING ELECTRICITY HAVING VOLTAGE-BOOSTER CHOPPER CIRCUIT WITH AN IGBT TRANSISTOR

(75) Inventors: Régis Giraud, Angouleme (FR); Christian Andrieux, Angouleme (FR); Eric Coupart, Angouleme (FR)

(73) Assignee: Moteurs Leroy-Somer, Angouleme (FR)

( * ) Notice: Subject to any disclaimer, the term of this patent is extended or adjusted under 35 U.S.C. 154(b) by 0 days.

(21) Appl. No.: 09/634,839

(22) Filed: Aug. 8, 2000

(30) Foreign Application Priority Data

Aug. 9, 1999 (FR) ............................................. 99 10324

(51) Int. Cl.$^7$ .......................... H02H 7/06; H02P 11/00; H02P 9/00
(52) U.S. Cl. ............................. 322/23; 322/29; 322/28
(58) Field of Search .............................. 322/29, 20, 25, 322/37, 47, 46, 23, 28; 310/114

(56) References Cited

U.S. PATENT DOCUMENTS

| | | | | |
|---|---|---|---|---|
| 3,931,563 A | * | 1/1976 | Stacey | 321/7 |
| 3,953,753 A | * | 4/1976 | Barrett | 310/168 |
| 4,038,575 A | * | 7/1977 | Nordebo | 310/179 |
| 4,179,729 A | * | 12/1979 | Stanton et al. | 363/175 |
| 4,228,362 A | * | 10/1980 | Jacobs et al. | 290/44 |
| 4,292,531 A | * | 9/1981 | Williamson | 290/14 |
| 4,450,396 A | * | 5/1984 | Thornton | 318/696 |
| 4,651,081 A | | 3/1987 | Nishimura et al. | 320/64 |
| 4,670,696 A | * | 6/1987 | Byrne et al. | 318/701 |
| 4,825,139 A | * | 4/1989 | Hamelin et al. | 322/90 |
| 4,934,822 A | * | 6/1990 | Higaki | 363/37 |
| 5,012,177 A | * | 4/1991 | Dhyanchand et al. | 322/10 |
| 5,218,283 A | * | 6/1993 | Wills et al. | 318/123 |
| 5,236,518 A | * | 8/1993 | Shirai et al. | 148/122 |
| 5,506,484 A | * | 4/1996 | Munro et al. | 318/599 |
| 5,552,681 A | * | 9/1996 | Suzuki et al. | 318/139 |
| 5,568,023 A | * | 10/1996 | Grayer et al. | 318/139 |
| 5,581,171 A | * | 12/1996 | Kerfoot et al. | 320/50 |
| 5,602,463 A | * | 2/1997 | Bendall et al. | 323/266 |
| 5,793,625 A | | 8/1998 | Balogh | |
| 5,811,904 A | * | 9/1998 | Tajima et al. | 310/156.45 |
| 5,831,409 A | * | 11/1998 | Lindberg et al. | 318/801 |
| 5,942,818 A | * | 8/1999 | Satoh et al. | 310/46 |
| 6,023,137 A | * | 2/2000 | Kumar et al. | 318/254 |
| 6,034,459 A | * | 3/2000 | Matsunobu et al. | 310/156.38 |
| 6,069,431 A | * | 5/2000 | Satoh et al. | 310/256 |
| 6,157,175 A | | 12/2000 | Morinigo et al. | 322/28 |
| 6,175,217 B1 | * | 1/2001 | Da Ponte et al. | 322/19 |
| 6,239,996 B1 | * | 5/2001 | Perreault et al. | 363/89 |
| 2002/0105819 A1 | * | 8/2002 | Giraud et al. | 363/86 |

FOREIGN PATENT DOCUMENTS

| | | |
|---|---|---|
| DE | 198 45 569 A 1 | 4/1999 |
| GB | 2 289 581 A | 11/1995 |
| JP | 07-107717 | 4/1995 |
| JP | 07-163111 | 6/1995 |
| JP | 07-236259 | 9/1995 |
| JP | 8-505518 | 6/1996 |
| JP | 10-248247 | 9/1998 |
| JP | 11-206112 | 7/1999 |
| TR | WO0074225 | * 12/2000 |
| WO | WO 95/00996 | 1/1995 |

\* cited by examiner

*Primary Examiner*—Nicholas Ponomarenko
*Assistant Examiner*—Julio C. Gonzalez
(74) *Attorney, Agent, or Firm*—Oliff & Berridge, PLC

(57) ABSTRACT

The invention provides a device for producing electricity intended in particular to be stowed on board a vehicle or a container, including a three-phase alternator able to be driven in rotation at a variable speed by a thermal engine, a rectifier for generating a rectified current form the current delivered by the alternator and a voltage-booster chopper using the self-inductance of the alternator to step up the voltage. The alternator includes six or eight poles and operates with a switching frequency of preferably between 3 and 15 kHz.

20 Claims, 3 Drawing Sheets

Figure 1:
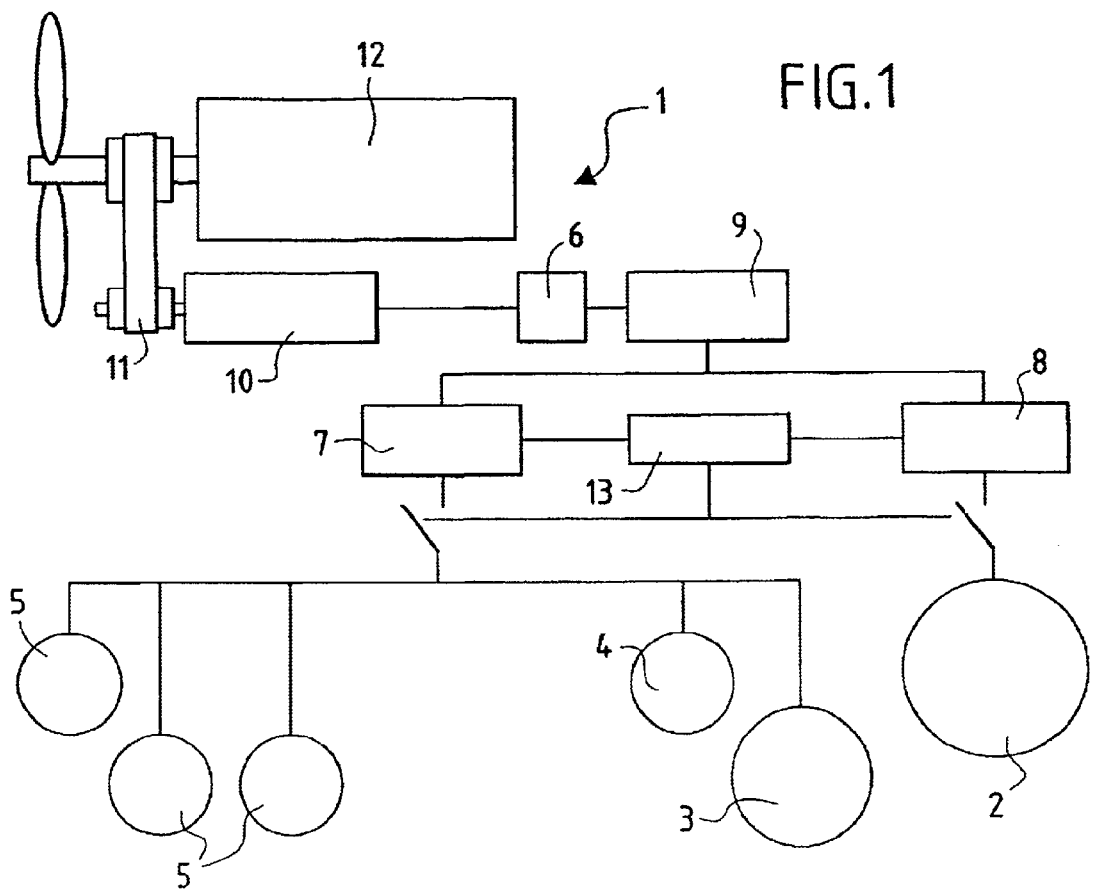

DEVICE FOR PRODUCING ELECTRICITY HAVING VOLTAGE-BOOSTER CHOPPER CIRCUIT WITH AN IGBT TRANSISTOR

The present invention relates to the field of the production of electricity on board vehicles or containers for example, by means of an alternator, a rectifier and a voltage-booster chopper.

A large number of on-board devices for producing electricity have been proposed, the objective being in particular to reduce the weight of the equipment.

Numerous devices have been proposed in which the voltage-booster chopper uses the self-inductance of the alternator, thereby making it possible to avoid the use of a chopper-specific coil.

The application GB-A-2289581 in particular discloses a device comprising a conventional three-phase alternator, a rectifier and a half-bridge chopper downstream of the rectifier.

Such a device is relatively complex and limited in terms of power.

The U.S. Pat. No. 5,793,625 also discloses a device of 100 W power, in which the alternator is conventional and the voltage-booster chopper comprises several FET transistors operating at a very high switching frequency.

Furthermore, the U.S. Pat. No. 4,825,139 discloses a device in which the alternator is conventional, the voltage-booster chopper using several MOS transistors.

These known devices are not entirely satisfactory, being of relatively complex structure and unsuitable for delivering power of the order of a kW at least.

To the knowledge of the applicant, only the automobile sector uses four-pole alternators, having the advantage of being simple to manufacture and of delivering a current at a relatively low frequency, and hence with small losses in the magnetic circuit.

This is because, generally, the losses in the magnetic circuit increase with the frequency of the current wave, and hence with the number of poles.

Moreover, at constant inductance value, the voltage drop dues to the phenomenon of overlap in the diodes of the rectifier increases with the frequency of the current delivered by the alternator, thereby prompting the use of a small number of poles.

Furthermore, the advantage of operating the voltage-booster chopper with a very high switching frequency is that it reduces the level of the current harmonics and consequently the heating up of the alternator.

There is a need to provide a device making it possible to generate a relatively high power with satisfactory efficiency, the power being typically between 1 and 30 kW, reliable and of low weight, capable of being stowed on board a vehicle or a container for example.

The subject of the present invention is therefore a novel device for producing electricity intended in particular to be stowed on board a vehicle or a container, comprising a three-phase alternator able to be driven in rotation at a variable speed by a thermal engine, a rectifier for generating a rectified current from the current delivered by the alternator and a voltage-booster chopper using the self-inductance of the alternator to step up the voltage, this device being characterized in that the alternator comprises six or eight poles and in that the chopper operates with a switching frequency of preferably between 3 and 15 kHz.

Preferably, use is made of an alternator having eight poles and a switching frequency of less than 10 kHz, preferably less than 8 kHz and preferably still of the order of 7.5 kHz.

The applicant company has found that it was possible to operate the device according to the invention at such a switching frequency with satisfactory overall efficiency, the device additionally being reliable and relatively easy to construct.

Whereas, when increasing the number of poles of the alternator, one might expect a degradation in the performance of the device, on account of the increase in the losses within the magnetic circuit, it transpires that surprisingly the device according to the invention exhibits a cost, weight and efficiency which are fully compatible with its use on a vehicle or a container.

One attempt at explanation is that the increase in the number of poles has made it possible to considerably reduce the value of the inductance of the alternator and to afford a saving in the voltage drop through overlap, hence a reduction in the current and in the joule losses of the alternator, thereby compensating for the increase in the magnetic losses within the alternator due to the higher number of poles than that of conventional on-board alternators and the increase in losses through switching in the chopper.

Preferably, the % self-inductance per phase of the alternator, defined by the formula $L\omega I_N/V_0$, where L is the self-inductance of the alternator, $\omega$ the angular frequency, $I_N$ the nominal current at a given speed, for example 1500 rpm, and $V_0$ the no-load voltage of the alternator at the said speed, is between 15 and 40%, preferably between 20 and 30%.

In a preferred embodiment corresponding to a power of the order of 10 kW, the voltage being 294 volts between phases at 3000 rpm, the inductance per phase of the alternator is less than or equal to 2 mH, preferably less than or equal to 1.5 mH, this corresponding to a % inductance of less than 30%.

In an embodiment corresponding to a power of the order of 10 kW, the voltage being 294 volts between phases at 3000 rpm, the inductance per phase of the alternator is greater than or equal to 1 mH, this corresponding to a % inductance of greater than 20%, and the switching frequency is of the order of 5 kHz.

The applicant company has found that these inductance and frequency values made it possible, in the case of an eight-pole alternator to maintain the losses due to the current harmonics at a particularly low level.

Preferably, the alternator is of the permanent-magnet type.

Also preferably, the chopper is downstream of the rectifier, thereby making it possible to use just one transistor, for example an IGBT transistor.

This single transistor can be easily cooled by circulating a liquid, whereas in the known devices whose choppers comprise several transistors, this cooling is made more difficult on account of the number of transistors, which may not be mounted on a common cooler without posing insulation problems.

Preferably, the switching frequency is constant, thereby simplifying the control electronics.

In a preferred embodiment, the chopper supplies at least one inverter controlled by a control circuit receiving a cue representative of the speed of rotation of the rotor of the alternator.

Thus, the control circuit can take into account the power available for the apparatuses linked to the inverter, and control their operation accordingly.

The subject of the invention is also an on-board electric generator of power lying between 1 and 30 kW, characterized in that it comprises in combination a three-phase alternator with eight poles of the permanent-magnet type, of % self-inductance per phase of between 20 and 40%, preferably between 20 and 30%, able to be driven in rotation at variable speed by a thermal engine, a rectifier for generating a rectified current from the current delivered by the alternator and a voltage-booster chopper downstream of the rectifier, this chopper using the self-inductance of the alternator to step up the voltage and using a single IGBT transistor operating at a switching frequency of preferably less than 8 kHZ, preferably still of the order of 7.5 kHz, to short-circuit the alternator.

Figure 2:
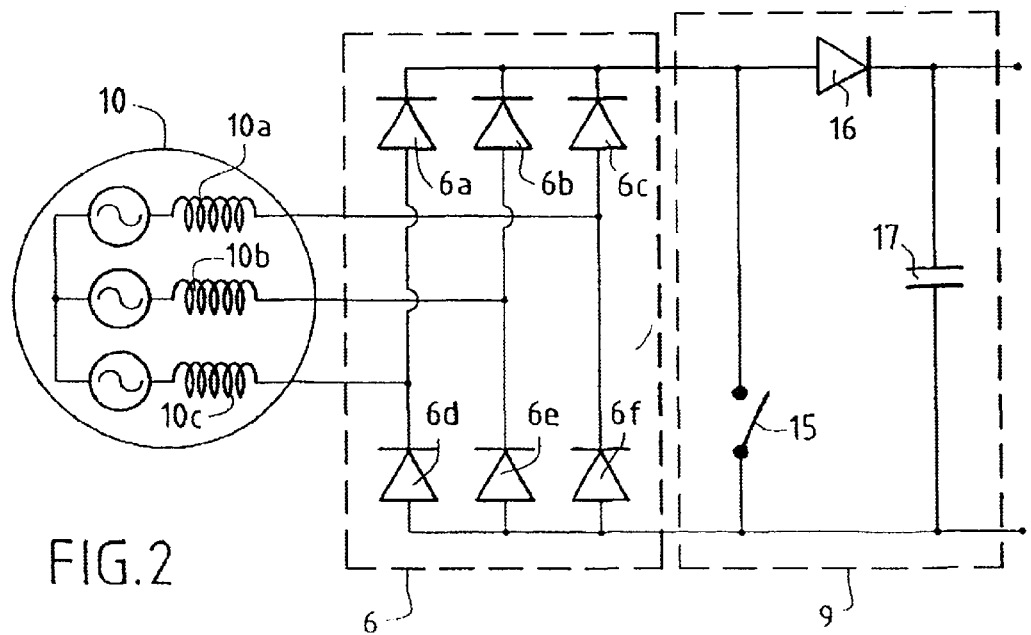
Figure 3:
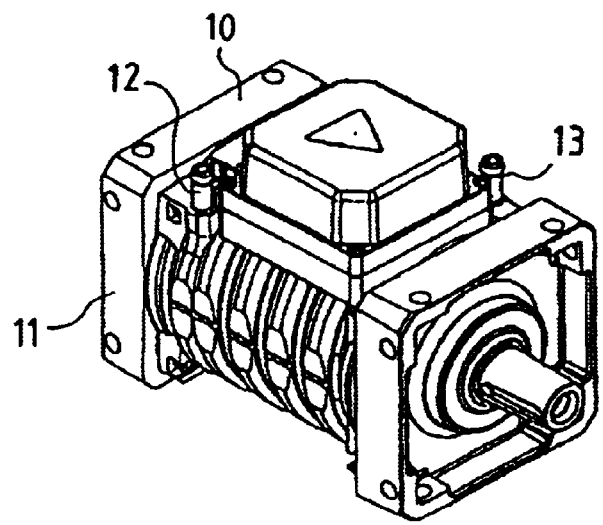
Figure 4:
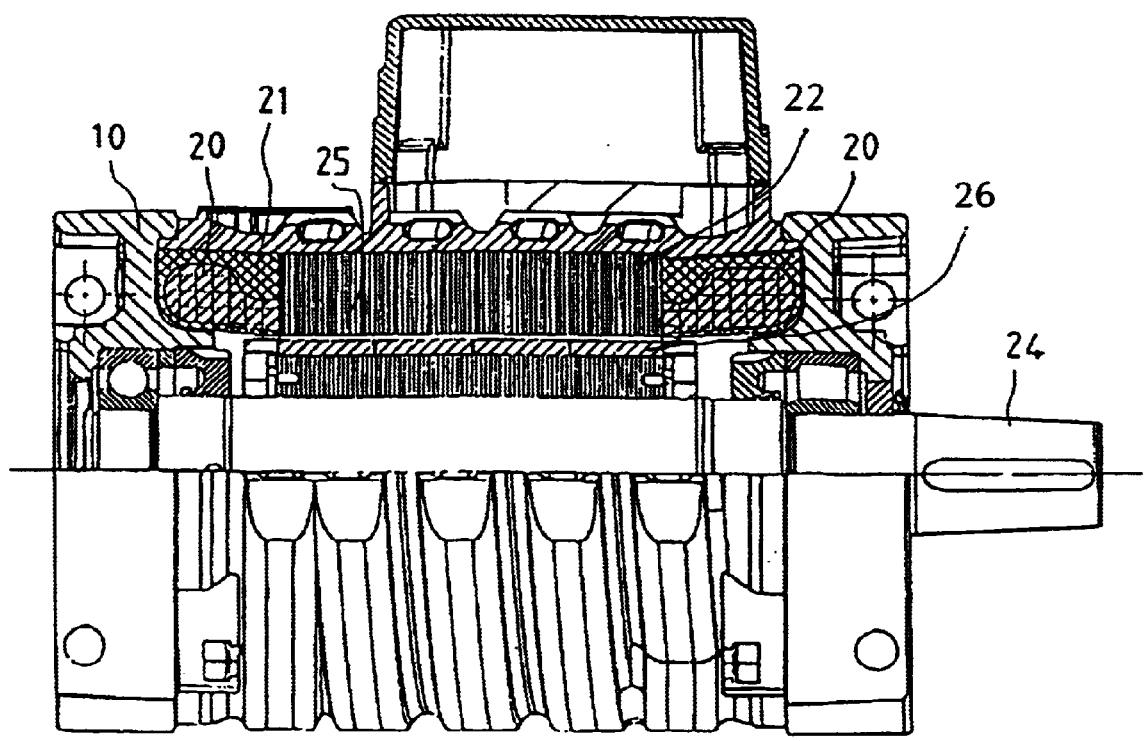

The invention will be better understood on reading the detailed description which follows, of an exemplary non-limiting embodiment of the invention, and on examining the appended drawing in which:

FIG. 1 is a block diagram of an energy arrangement on board a motor vehicle and comprising a device for producing electricity in accordance with the invention, FIG. 2 is a simplified electrical diagram of the device for producing electricity according to the invention, FIG. 3 represents the alternator in perspective in isolation, FIG. 4 is a side view with axial cutaway of the alternator of FIG. 3.

Figure 5:
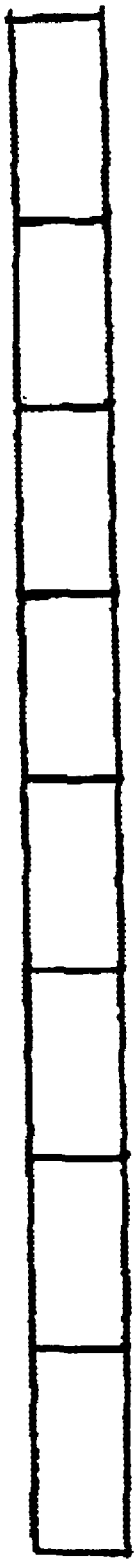
Figure 6:

FIG. 5 is a diagram of 8 poles of an alternator according to one embodiment of this invention, and FIG. 6 is a diagram of 6 poles of an alternator according to another embodiment of this invention.

These apparatuses 2 to 5 are supplied with three-phase current at constant or variable frequency by two inverters 7 and 8 supplied with DC current by a voltage-booster chopper 9 linked to a rectifier 6 itself linked to an alternator 10 whose rotor is driven in rotation, by way of a transmission 11, by a thermal engine 12, for example a diesel engine, whose speed of rotation is liable to vary, typically between 600 and 3600 rpm.

A transmission 11 makes it possible to multiply for example by a factor of 2 or 3 the speed of rotation of the rotor, so that the alternator 10 is driven at a speed of rotation of for example between 1500 rpm when the engine is idling and at more than 5000 rpm when the engine 12 is turning at a fast rate.

The arrangement 1 comprises a control circuit 13 receiving a cue representative of the speed of rotation of the rotor of the alternator 10 and controls the various user apparatuses 2 to 5 as a function of the power available at the level of the inverters 7 and 8.

The alternator 10 is three-phase and comprises three coils 10*a*, 10*b* and 10*c*, each of self-inductance L.

The rectifier 6 comprises, in a manner known per se, six diodes 6*a* to 6*f* configured so as to deliver a rectified voltage.

The voltage-booster chopper 9 comprises an electronic breaker 15 able to short-circuit the output of the rectifier 6, a diode 16 downstream of the breaker 15 and a storage capacitor 17 at output.

The chopper 9 is of the parallel-chopper type and uses the self-inductance of the alternator 10 to store the reactive energy.

In the exemplary embodiment described, the electronic breaker 15 consists of a single IGBT transistor, controlled by an electronic control circuit for switching at a constant switching frequency, this electronic control circuit being embodied in a conventional manner and not being represented for the sake of clarity of the drawing.

The electronic control circuit is advantageously configured in such a way as to modify the duty ratio of the control signal of the electronic breaker 15 as a function of the voltage at the output of the step-up chopper 9, so as to regulate this voltage to a setpoint value.

In the particular exemplary embodiment described, the switching frequency is 5 kHz.

The alternator 10 has been represented in isolation in FIGS. 3 and 4.

The alternator 10 comprises a casing 11 designed to be cooled by a liquid, provided for this purpose with nipples 12 and 13 for connecting to a cooling-water circuit.

The alternator 10 is, in the exemplary embodiment described, a three-phase alternator comprising eight poles, as shown in FIG. 5, the three coils 10*a*, 10*b* and 10*c* each being coiled in a conventional manner in notches of the stator 25 of the alternator 10, the latter comprising in total forty-eight notches and teeth 22. FIG. 6 shows a diagram of an embodiment of this invention having 6 poles.

The rotor 24 comprises, in the exemplary embodiment described, permanent magnets 26, as shown in FIG. 4, with four per pole.

Preferably, use is made of magnets having a fairly weak remanent field but with a good coercivity ($B_r$ around 1.1 T nominal at 20° C. and $H_{cj}$ around 900 kA/m nominal at 150° C.).

The thickness of the magnets used is equal to 5 mm.

Preferably, the stator laminations are made of silicon alloy, the length of the irons being of the order of 115 mm.

Again in the exemplary embodiment described, the number of turns is equal to 21.

Furthermore, as may be seen in FIG. 4, the lead-outs 20 formed by the wires of the coils outside the irons of the stator standing proud of either side of these latter are embedded in a conductive resin 21, thereby making it possible in particular to reduce the losses therefrom.

In the exemplary embodiment described, the power of the device is of the order of 10 kW and the self-inductance L per phase of the alternator is of the order of 1.3 mH.

The switching frequency of the electronic breaker 15 and the value of the self-inductance of each phase of the alternator make it possible to obtain, simultaneously, losses by switching in the electronic breaker 15 and a level of harmonics which are compatible with the desired performance.

The chosen value of the self-inductance per phase which is makes it possible on the one hand to maintain the harmonics at a relatively low level, given the switching frequency of the electronic breaker, and on the other hand to prevent the voltage drop due to the overlap phenomenon from turning out to be prejudicial to the output power of the step-up chopper.

The % inductance is chosen between 20 and 40%, preferably being between 20 and 30%.

Of course, the invention is not limited to the exemplary embodiment just described.

It is in particular possible to use one or more appropriate components as the electronic breaker 15, which are capable of fulfilling the function of short-circuiting the output of the rectifier; it is however advantageous to use a single component since the latter may easily be cooled by circulating liquid, whereas in the case of multiple components, the liquid cooling poses electrical insulation problems in regard to these various components.

The shrouding of the lead-outs of the stator of the alternator in a conductive resin is not indispensable but has the advantage of making it easier to cool the coils and of increasing the power per unit mass of the alternator.

Likewise, the use of permanent magnets to excite the stator of the alternator is a preferential solution, but the use of separate excitation does not depart from the scope of the present invention.

Several alternators 10 may be placed side by side, driven by a common axle, with a view to increasing the power delivered.

Finally, by virtue of the invention, there is provided an electric generating device of relatively high power, typically between 1 and 30 kW, of relative low weight, reliable and of high efficiency.

What is claimed is:

1. A device for producing electricity on-board a vehicle or a container, comprising:
    a three-phase alternator having a self-inductance and six or eight poles and configured to be driven in rotation by a thermal engine; wherein $0.15 \leq L\omega I_n/V_0 < 0.4$, where L is the self-inductance per phase of the alternator, $\omega$ the angular frequency of a rotor of the alternator, $I_n$ the nominal current at a given speed of rotation of the rotor and $V_0$ the no-load output voltage of the alternator at said speed;
    a rectifier having an input connected to said alternator and an output for generating a rectified current; and
    a voltage-booster chopper comprising a switching element connected to the output of the rectifier for generating a stepped-up voltage at the output of the rectifier, said stepped-up voltage being induced by the self-inductance of the alternator.

2. A device according to claim 1, wherein the switching element operates with a switching frequency between 3 and 15 kHz.

3. A device according to claim 2, wherein the switching frequency is less than 10 kHz.

4. A device according to claim 2, wherein the switching frequency is substantially 7.5 kHz.

5. A device according to claim 1, wherein the alternator has eight poles.

6. A device according to claim 1, wherein the alternator comprises a stator having forty-eight teeth.

7. A device according to claim 1, wherein $0.2 \leq L\omega I_n/V_0 \leq 0.3$.

8. A device according to claim 1, wherein a rotor of the alternator comprises permanent magnets.

9. A device according to claim 1, wherein an output power delivered by the device is between 1 and 30 kW.

10. A device according to claim 1, wherein an output power of the device is substantially 10 kW.

11. A device according to claim 10, wherein the voltage is of 294 Volts between phases of the alternator at a rotational speed of a rotor of the alternator of 3000 rpm.

12. A device according to claim 1, wherein the switching element is made of a single IGBT transistor.

13. A device according to claim 1, wherein a switching frequency is constant.

14. A device according to claim 1, wherein the device supplies at least one inverter controlled by a control circuit receiving a cue representative of a speed of rotation of a rotor of the alternator.

15. A device according to claim 1, wherein the self-inductance of the alternator per phase is less than or equal to 2 mH.

16. A device according to claim 15, wherein the self-inductance of the alternator per phase is less than or equal to 1.5 mH.

17. A device according to claim 15, wherein the self-inductance of the alternator per phase is greater than or equal to 1 mH.

18. A device according to claim 1, wherein the alternator is configured to be driven at a variable speed by the thermal engine.

19. An on-board electric generator comprising:
    a three-phase alternator with eight poles and having permanent-magnets, said alternator being configured to be driven in rotation at a variable speed of rotation by a thermal engine, wherein $0.15 \leq L\omega I_n/V_0 \leq 0.4$, where L is the self-inductance per phase of the alternator, $\omega$ the angular frequency of a rotor of the alternator, $I_n$ the nominal current at a given speed of rotation of the rotor and $V_0$ the no-load output voltage of the alternator at said speed,
    a rectifier having an input connected to said alternator and an output for generating a rectified current, and
    a voltage-booster chopper comprising a switching element connected to the output of the rectifier and operating at a switching frequency between 3 and 10 kHz.

20. A device according to claim 19, wherein the switching frequency is substantially 7.5 kHz.

* * * * *